S. SANTILLI.
SEPARATOR.
APPLICATION FILED AUG. 12, 1920.

1,358,337.

Patented Nov. 9, 1920.

INVENTOR
Stefano Santilli
By Frease, Merkel, Saywell & Bond
ATTYS.

UNITED STATES PATENT OFFICE.

STEFANO SANTILLI, OF CANTON, OHIO.

SEPARATOR.

1,358,337.

Specification of Letters Patent.

Patented Nov. 9, 1920.

Application filed August 12, 1920. Serial No. 402,959.

*To all whom it may concern:*

Be it known that I, STEFANO SANTILLI, a subject of the King of Italy, residing at Canton, in the county of Stark and State of Ohio, have invented a new and useful Separator, of which the following is a specification.

This invention relates to separators and particularly to that class of separators designed for separating grapes and similar fruit from the stems, and has for its objects the provision of a device comprising a cylindrical cage or basket having meshes of sufficient size to allow the fruit to pass therethrough, means being provided for rocking or shaking the cage, a shaft extending concentrically through the cage and provided with fingers arranged to agitate the fruit within the cage and tear the same from the stems, means being provided for rotating said shaft.

With these objects in view, the invention consists in the construction and arrangement of parts, hereinafter described, illustrated in the accompanying drawings and particularly pointed out in the claims, it being understood that various changes in the form proportions and details of construction may be made within the scope of the claims without departing from the invention.

The invention thus set forth in general terms is illustrated in the accompanying drawings forming part hereof, in which—

Figure 1:
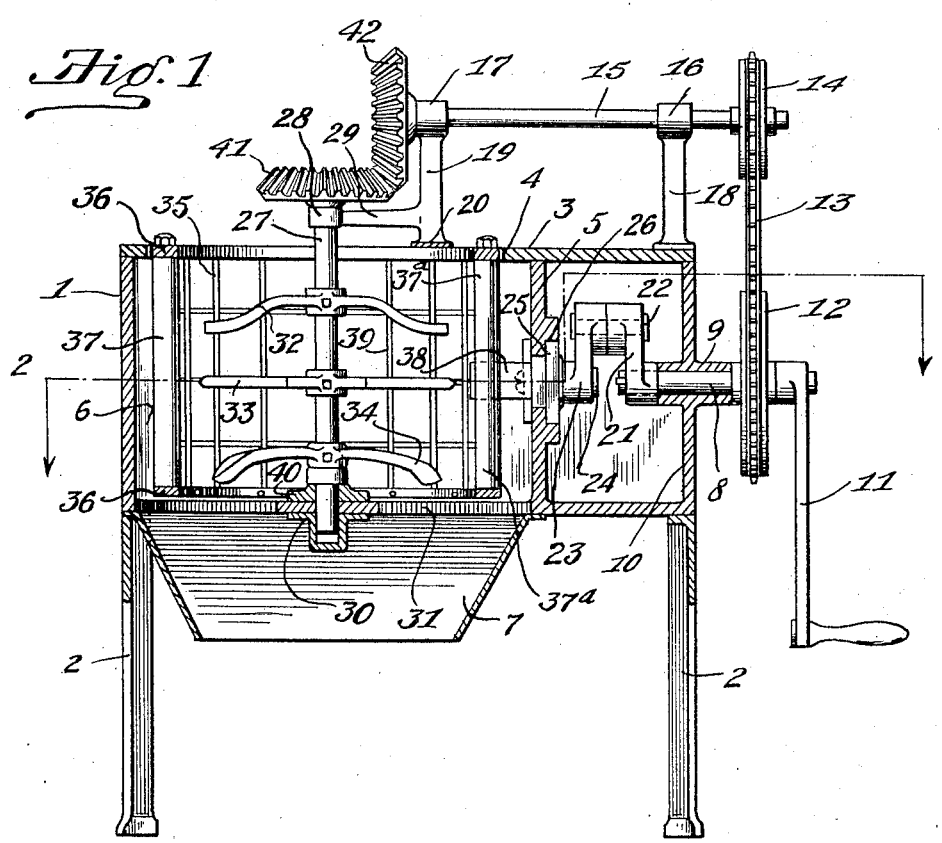
Figure 2:
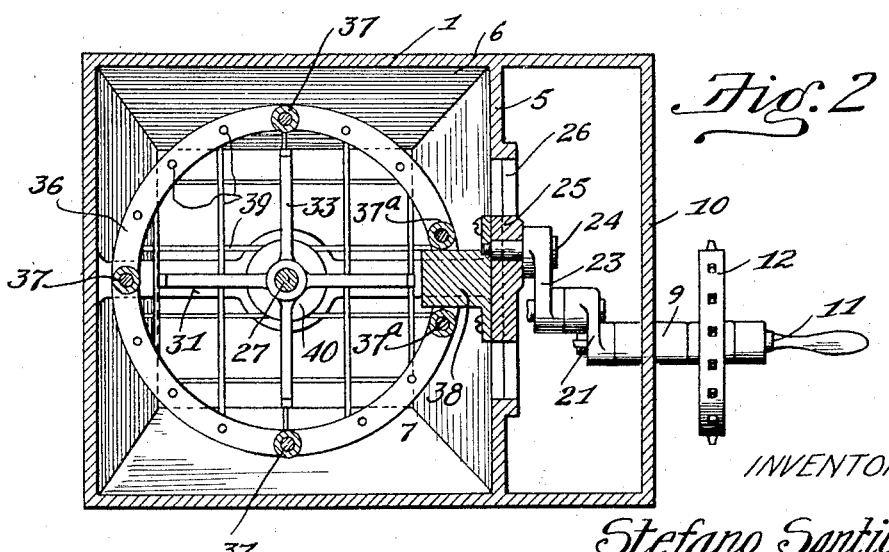

Figure 1 is a longitudinal sectional view through a separator embodying the invention; and Fig. 2 a section on the line 2—2 Fig. 1.

A practical embodiment of the invention is disclosed in the accompanying drawings, forming a part of this specification, in which similar numerals of reference indicate corresponding parts throughout the several views.

The housing 1 is supported upon suitable standards 2 and provided with a cover plate 3 having a circular opening 4 therein. A partition wall 5 is provided within the housing forming a substantially square chamber 6 therein, the bottom of said chamber being open and provided with a hopper 7.

The shaft 8 is journaled in a suitable bearing 9 formed in the outer wall 10 of the housing, a crank 11 or the like being provided upon said shaft for the purpose of transmitting power thereto, a sprocket wheel 12 being also carried by said shaft for the purpose of conveying power from the shaft through the chain 13 to the sprocket 14 which is mounted upon the shaft 15 journaled in suitable bearings 16 and 17 carried by the brackets 18 and 19 respectively, the bracket 18 being mounted upon the top plate 3 adjacent to the end wall 10 and the bracket 19 being mounted upon a transverse bar 20 which is supported upon the top plate and extends across the opening 4.

A crank arm 21 is fixed upon the inner extremity of the shaft 8 and is pivotally connected by means of a pin 22 with the pitman rod 23 said pitman rod being connected by the wrist pin 24 to the reciprocating head 25, said head being mounted for transverse horizontal movement within the guideway 26 formed in the partition wall 5.

A vertical shaft 27 is journaled through a bearing 28 carried upon the arm 29 of the bracket 19 and through a suitable bearing 30 mounted upon the bar 31 which extends across the top of the hopper 7, said shaft being provided at spaced intervals with agitating fingers. Preferably three sets of these fingers are provided as shown in Fig. 1 of the drawings, the upper fingers 32 being preferably downwardly and outwardly curved in order to allow the bunches of grapes or other fruit to be dropped into the basket or cage, the central fingers 33 being preferably straight and the lower fingers 34 being preferably curved downwardly to a point near the bottom of the basket or cage.

The basket or cage 35 is of cylindrical form and open at its top and comprises the upper and lower rings 36 connected together at spaced intervals by the vertical rods 37, two of said rods indicated by the numeral 37ª, being slightly spaced from each other to receive the lug 38 which is carried by the reciprocating head 25. A wire mesh 39, of suitable size to allow the grapes or other fruit to pass therethrough connects the upper and lower rings 36, the bottom of the basket being also formed of a similar wire mesh attached to the lower ring 36.

The upper ring 36 is of slightly less diameter than the opening 4 in the top plate and is mounted concentrically therein, a bearing member 40 being connected to the mesh bottom of the basket and rotatably mounted upon the shaft 27. A bevel gear 41 mounted upon the upper end of the shaft 27, meshes with the bevel gear 42 carried by the shaft 15.

The operation of the device is as follows:
The grapes are placed within the upper open end of the basket or cage 35 and the crank 11 rotated, the head 25 being reciprocated, through the lug 38 rocking the basket upon its vertical axis, while the shaft 27 carrying the agitating fingers is continuously rotated in one direction through the chain gearing and bevel gears above described. The agitating fingers will tear the fruit from the stems and the continuous rocking or shaking of the basket will cause the loosened fruit to drop through the wire mesh of the basket into the hopper 7, a suitable receptacle being placed beneath said hopper to receive the fruit. The stems may be removed from the cage after all of the fruit has been stemmed and discharged therefrom.

I claim:—

1. A device of the character described comprising a housing provided with an open hopper in its lower portion, a vertical mesh basket open at its upper end and mounted within said housing above the hopper, a concentric shaft located through said basket, agitating fingers upon the shaft, means for continuously rotating the shaft in one direction and means for rocking the basket upon its axis.

2. A device of the character described comprising a housing provided with an open hopper in its lower portion, a vertical mesh basket open at its upper end and mounted within said housing above the hopper, a concentric shaft located through said basket, agitating fingers upon the shaft, certain of said fingers being curved downwardly into proximity with the bottom of the basket, means for continuously rotating the shaft in one direction, and means for rocking the basket upon its axis.

3. A device of the character described comprising a housing provided with an open hopper in its lower portion, a vertical mesh basket open at its upper end and mounted within said housing above the hopper, a concentric shaft located through said basket, agitating fingers upon the shaft, means for continuously rotating the shaft in one direction, a horizontally reciprocating head and a lug upon said head engaging the basket for rocking the basket upon its axis.

4. A device of the character described comprising a housing provided with an open hopper in its lower portion, a vertical mesh basket open at its upper end and mounted within said housing above the hopper, a concentric shaft located through said basket, agitating fingers upon the shaft, means for continuously rotating the shaft in one direction, a horizontally reciprocating head and a lug upon said head engaging the basket for rocking the basket upon its axis, a drive shaft, means operatively connecting the drive shaft with the reciprocating head and means operatively connecting the drive shaft with said concentric shaft to continuously rotate the same in one direction.

In testimony that I claim the above, I have hereunto subscribed my name.

STEFANO SANTILLI.